US012490684B2

(12) United States Patent
Syed

(10) Patent No.: US 12,490,684 B2
(45) Date of Patent: Dec. 9, 2025

(54) DECORATIVE DISPLAY APPARATUSES

(71) Applicant: Skyed Innovations Limited, Mississauga (CA)

(72) Inventor: Sophia Syed, Mississauga (CA)

(73) Assignee: Skyed Innovations Limited, Mississauga (CA)

( * ) Notice: Subject to any disclaimer, the term of this patent is extended or adjusted under 35 U.S.C. 154(b) by 62 days.

(21) Appl. No.: 18/437,973

(22) Filed: Feb. 9, 2024

(65) Prior Publication Data

US 2024/0276923 A1 Aug. 22, 2024

Related U.S. Application Data

(60) Provisional application No. 63/485,575, filed on Feb. 17, 2023.

(51) Int. Cl.
*A01G 5/04* (2006.01)
*G09F 7/04* (2006.01)

(52) U.S. Cl.
CPC .................................... *A01G 5/04* (2013.01); *G09F 7/04* (2013.01)

(58) Field of Classification Search
CPC .... A01G 5/04; G09F 7/04; G09F 7/18; G09F 13/00; A47G 1/17; A47G 1/06; A47G 1/1666
See application file for complete search history.

(56) References Cited

U.S. PATENT DOCUMENTS

| | | | | | |
|---|---|---|---|---|---|
| 4,216,597 | A * | 8/1980 | Kocina | A47G 1/0605 | 40/792 |
| 5,100,094 | A * | 3/1992 | Handwerger | A47G 1/1666 | 40/757 |
| 8,205,369 | B2 * | 6/2012 | Pemberton | G09F 7/04 | 40/576 |
| 8,434,388 | B2 * | 5/2013 | Chaffins | B67B 7/16 | 81/3.25 |
| 9,406,247 | B2 * | 8/2016 | Disney | H04L 67/02 | |
| 11,348,493 | B2 * | 5/2022 | Wriedt | G09F 15/0012 | |
| 2008/0263917 | A1 * | 10/2008 | Kwon | G09D 3/04 | 40/110 |
| 2010/0319494 | A1 * | 12/2010 | Chaffins | B67B 7/16 | 81/3.09 |
| 2014/0047746 | A1 * | 2/2014 | Errair | A47G 1/0627 | 40/711 |
| 2015/0272350 | A1 * | 10/2015 | Frankenstein | A47G 1/06 | 40/745 |

* cited by examiner

*Primary Examiner* — Anita M King
(74) *Attorney, Agent, or Firm* — Miller IP Law; Devin Miller

(57) ABSTRACT

Described herein are examples of apparatuses which include a base, an interchangeable component, and a mounting component. The base may be configured to securely support an interchangeable component when coupled to the base. The interchangeable component may include a magnet, a first surface comprising a decorative element and a second surface configured to be magnetically coupled to the base via the magnet. The mounting component may be removably coupleable from the second surface of the interchangeable component. The mounting component may be configured to securely attach the base to a first supporting surface and enable the base to rest or be positioned on a second supporting surface.

20 Claims, 5 Drawing Sheets

DECORATIVE DISPLAY APPARATUSES

CROSS-REFERENCE TO RELATED APPLICATIONS

The present application claims the benefit of U.S. Provisional Patent Application No. 63/485,575 entitled "Magnetic Interchangeable Door Signs", filed on Feb. 17, 2023. The entire contents of the above-listed application are hereby incorporated by reference for all purposes.

BACKGROUND

Throughout history, seasonal decorations, including but not limited to wreaths and welcome signs, have held a certain role as essential elements in home décor. These decorative items serve as expressive mediums, enabling individuals to convey a sense of festivity and partake in the celebration of diverse occasions. Specifically, these decorations play an important role in reflecting tradition and cultural practices associated with changing seasons, significant holidays, and cultural celebrations. By hanging or otherwise using them as décor in residential spaces or workplaces, individuals can not only infuse their homes or workplaces with a certain ambiance but also actively participate in the cultural and seasonal narratives that they subscribe to.

BRIEF DESCRIPTION OF THE DRAWINGS

The present description will be understood more fully when viewed in conjunction with the accompanying drawings of various examples of decorative display apparatuses. The description is not meant to limit the decorative display apparatus to the specific examples. Rather, the specific examples depicted and described are provided for explanation and understanding of decorative display apparatuses. Throughout the description the drawings may be referred to as drawings, figures, and/or FIGS.

DETAILED DESCRIPTION

Figure 1:
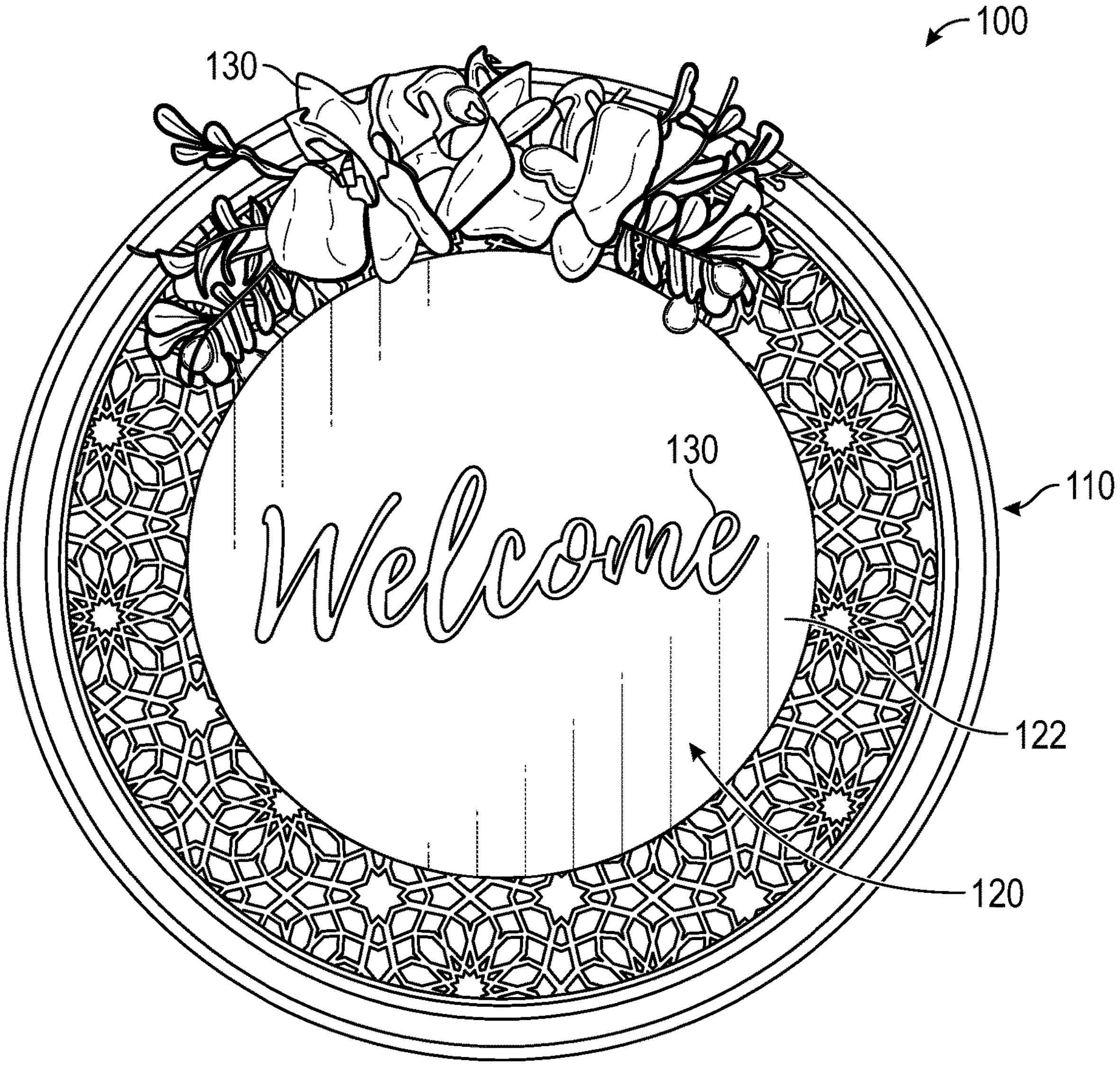
FIG. 1 depicts a top-down view of a decorative display apparatus, according to an embodiment.

A decorative display apparatus as disclosed herein will become better understood through a review of the following detailed description in conjunction with the figures. The detailed description and figures provide merely examples of the various embodiments of decorative display apparatuses. Many variations are contemplated for different applications and design considerations; however, for the sake of brevity and clarity, all the contemplated variations may not be individually described in the following detailed description. Those skilled in the art will understand how the disclosed examples may be varied, modified, and altered and not depart in substance from the scope of the examples described herein.

A conventional door-mounted seasonal decoration, such as a wreath or welcome sign, typically comes with a fixed design catering to a specific holiday or season. These traditional decorations offer limited versatility as they cannot be easily modified or personalized. Homeowners often find themselves needing to purchase multiple signs to accommodate different occasions throughout the year. Furthermore, the lack of diversity in available designs means that seasonal décor does not effectively cater to a broad range of holidays and cultural celebrations. The fixed nature of these conventional decorations restricts personal expression, with little room for customization or personalization, such as adding a family name or specific welcoming message.

The current state of door-mounted seasonal decorations presents several challenges and missed opportunities. Consumers face increased costs associated with purchasing multiple decorations, and storage becomes a practical concern due to the need to accommodate various signs for different occasions. Additionally, the limited design options fail to represent the full spectrum of holidays and cultural celebrations, creating a gap in the market. The inability to personalize these decorations further diminishes their appeal, contributing to a lack of uniqueness and individual expression in home décor. Additionally, the current state of door-mounted seasonal decorations exacerbate these challenges as they do not securely hold the decorations, causing them to fall or break, especially in outdoor environments with strong winds.

Implementations of magnetic interchangeable door signs aim to improve this landscape by introducing a three-part system consisting of a metal base, magnetic interchangeable inserts, and hanging mechanisms. This approach allows users to customize their decorations easily, adapting to various holidays, seasons, and personal preferences. The metal base serves as a one-time investment, while the magnetic inserts can be effortlessly swapped, reducing costs and addressing storage challenges. Furthermore, the introduction of third-party vendors for personalized magnetic inserts opens up new avenues for individual expression, enabling users to tailor their decorations to specific events or include personal messages.

The disclosed embodiments of magnetic interchangeable door signs offer a comprehensive solution to the problems associated with conventional decorations. By providing a versatile and customizable system, users can now achieve a broader range of designs without the need for multiple purchases. The magnetic inserts enhance user experience, promoting diversity and personalization in seasonal home décor. Overall, the disclosed embodiments represent a significant advancement in the field, catering to consumer needs for cost-effective, space-efficient, and uniquely personalized door-mounted decorations.

FIG. 1 depicts a top-down view of a decorative display apparatus 100, according to an embodiment. As shown in this figure, the decorative display apparatus 100 allows for display customization and versatile usage, including transformation into a flat tray or table art configuration. According to various embodiments, the decorative display apparatus 100 may include a base 110 with a magnetic material and an interchangeable component 120 having a decorative element 130.

The interchangeable component 120 may be configured for being replaced by coupling and removing the interchangeable component 120 from the base 110 and substituting it with another component. The interchangeable component 120 may include a first side 122 including the decorative element 130 coupled thereto and a second side opposite the first side 122. The decorative element 130 may include painted artwork, engraved patterns, printed designs, or textured surfaces on the interchangeable magnetic component 120. The decorative element 130 may also include motifs, holographic images, or sculpted relief. For example, in the embodiment shown in FIG. 1, for example, the decorative element includes wording engraved into the first surface of the interchangeable component 120 and flowers 130.

In an embodiment, the interchangeable component 120 may include a light-emitting element on the first side 122, and the base 110 may further include electrical contacts to provide power to the light-emitting element for illuminating the decorative element 130. Additionally, the decorative display apparatus 100 may further include a remote-control device configured to wirelessly control the decorative element 130 on the interchangeable component 120.

Figure 2:
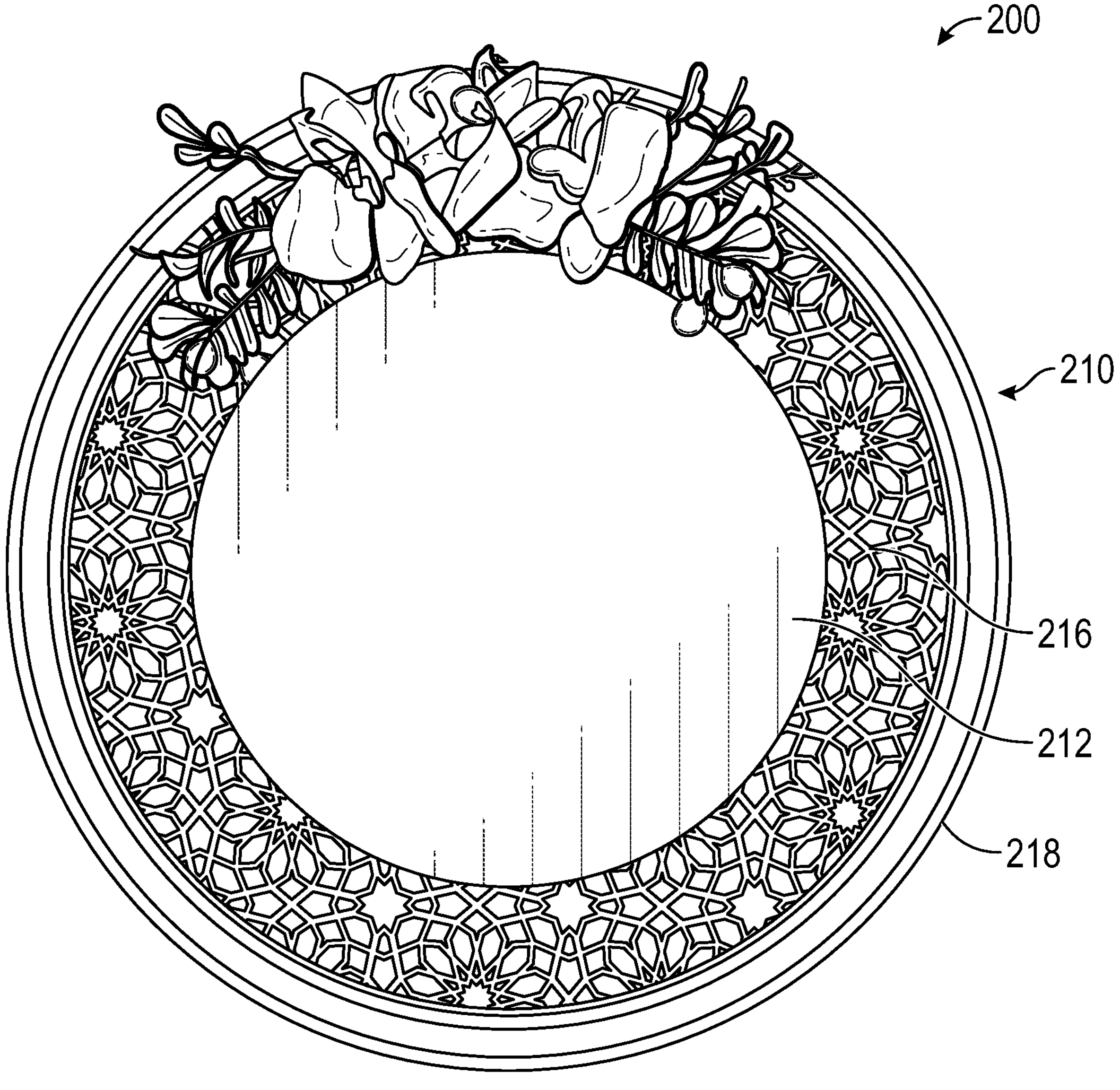
FIG. 2 depicts a front view of a base of a decorative display apparatus without an interchangeable component attached thereto, according to an embodiment.

FIG. 2 depicts a front view of a base 210 of a decorative display apparatus 200 without an interchangeable component attached thereto, according to an embodiment. The base 210 may be configured to securely support or hold the interchangeable component when coupled thereto. The base 210 may include a surface 212 constructed from a magnetic material. The magnetic material may include iron, nickel, cobalt, neodymium, gadolinium, ferrite, alnico, steel, or the like. The base may be circular-shaped, oval-shaped, square-shaped, rectangular-shaped, triangular-shaped, pentagonal-shaped, hexagonal-shaped, octagonal-shaped, or irregular-shaped. For example, in the embodiment shown in this figure, the base 210 may be a circular-shaped metal base with a laser cutout or etching 216 surrounding the magnetic surface or magnet 212. In an embodiment, the cutout or etching may include a symmetrical design or pattern that is aligned to follow the natural flow of the magnetic field emanating from the magnetic surface 212, which may maintain the magnetic functionality of the magnet surface 212. For instance, the design or pattern may complement or follow the natural direction or orientation of the magnetic field produced by the magnetic surface 212. Accordingly, the pattern or design does not compromise the effectiveness of the magnetic surface 212. The alignment may enhance the magnetic surface's capacity to securely hold the interchangeable component.

The cutout or etching 216 may include non-magnetic materials such as plastic, ceramic, or non-ferrous metals to prevent interference with the magnetic field, ensuring optimal performance. The design of the cutout or etching 216 may include patterns that align with the natural flow of magnetic field lines produced by the magnetic surface 212. In an embodiment, non-magnetic spacers may be introduced within the cutout to allow unobstructed magnetic field lines. By introducing these non-magnetic spacers, potential interruptions or disturbances in the magnetic field caused by the material of the cutout itself are minimized. This careful arrangement ensures that the magnetic forces generated by the magnetic surface 212 or central magnet can propagate freely and efficiently through the surrounding space, allowing the apparatus to maintain its intended magnetic strength.

Insulating materials, coatings, or specific cutout designs may be utilized to minimize the induction of eddy currents, thereby reducing unwanted magnetic influences. The geometry of the cutout or etching 216 may be configured to maintain an alignment for the desired magnetic field strength and configuration. For instance, a suitable distance between the cutout or etching and the central magnet may be made during manufacturing. This distance may be determined based on considerations of magnetic strength weight of the interchangeable component, and the like. For example, in an embodiment, a distance of 3 millimeters or more between the cutout edges and the central magnet may provide a strong magnetic hold for securely attaching the interchangeable component while maintaining. The distance may be adjusted during the manufacturing process to achieve optimal magnetic field strength and configuration for the intended application.

The magnetic surface 212 may be positioned at a center of the base 210. The base 210 may further include a wooden fitting 218 coupled to a peripheral annular edge of the base 210. The wooden fitting 218 may circumscribe the peripheral annular edge of the base 210. In an embodiment, the wooden fitting 218 may snugly or tightly circumscribe the peripheral annular edge of the base 210. In this context, "snugly" or "tightly" refers to the manner in which the wooden fitting 218 fits around the peripheral annular edge of the base 210. It indicates a close and secure fit, with minimal or no play or looseness, ensuring a precise and firm encirclement of the base's outer edge by the wooden fitting. In another embodiment, instead of wood, the fitting may include another suitable material, such as plastic, metal, ceramic, or composite materials.

Figure 3:
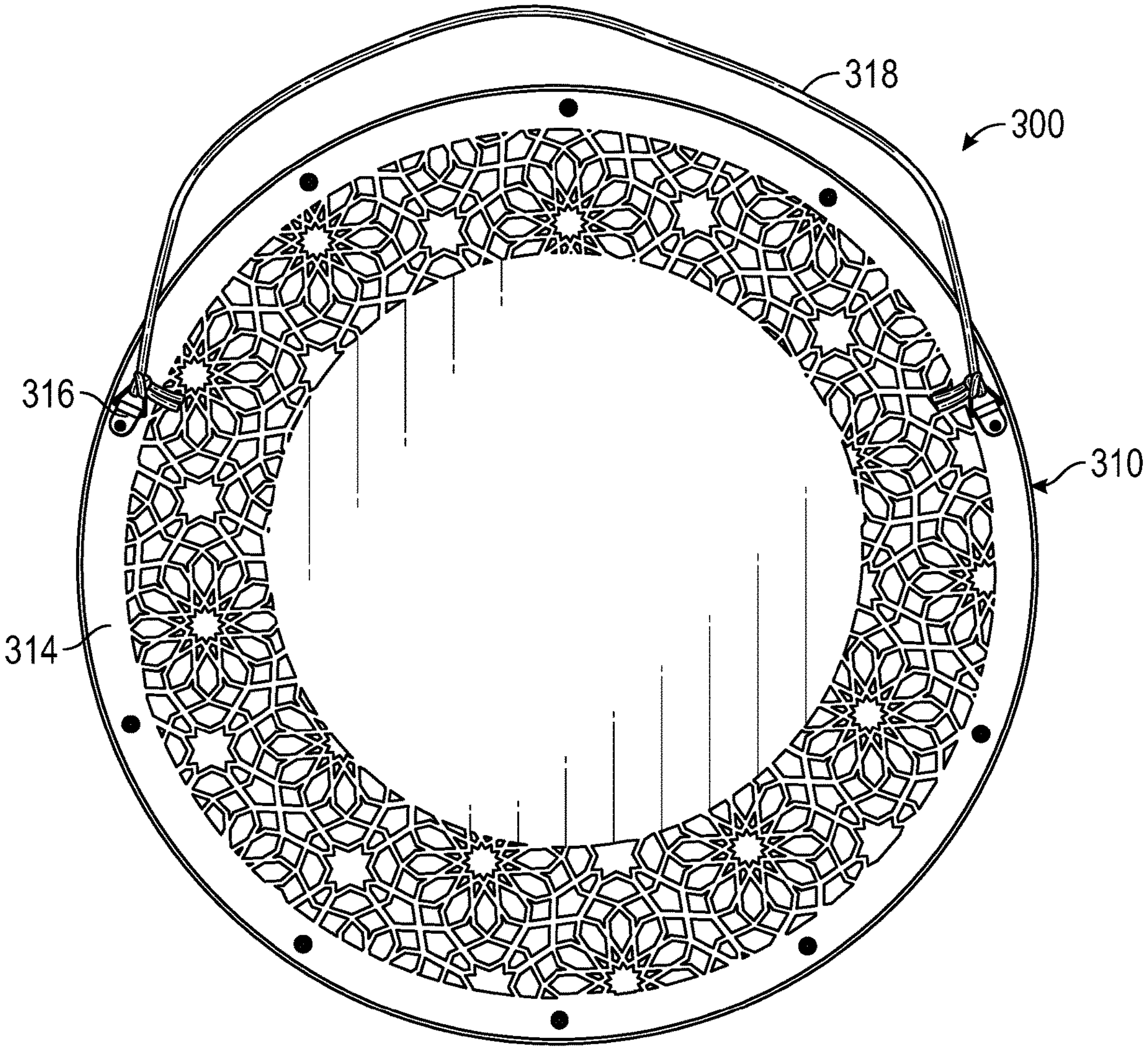
FIG. 3 depicts a rear view of a base of a decorative display apparatus, according to an embodiment.

FIG. 3 depicts a rear view of the base 310 of a decorative display apparatus 300, according to an embodiment. As shown in this figure, the base 310 may include a surface 314 opposite a surface constructed from a magnetic material on an opposite side of the base 310. The surface 314 may be configured to be positioned proximal to a supporting surface of a door, wall, table, or the like. In an embodiment, the decorative display apparatus 300 may further include two suspension hooks 316 attached to the surface 314 of the base 310. Each suspension hook 316 may be positioned on opposite ends of the surface 314 to receive a rope or string 318 therethrough, thereby forming a loop from the rope or string 318 for hanging and display of the apparatus on wall, door, or the like. The decorative display apparatus 300 is not limited to this embodiment, and other types of hooks or suspension mechanisms may be used to hand the decorative display apparatus 300.

Figure 4:
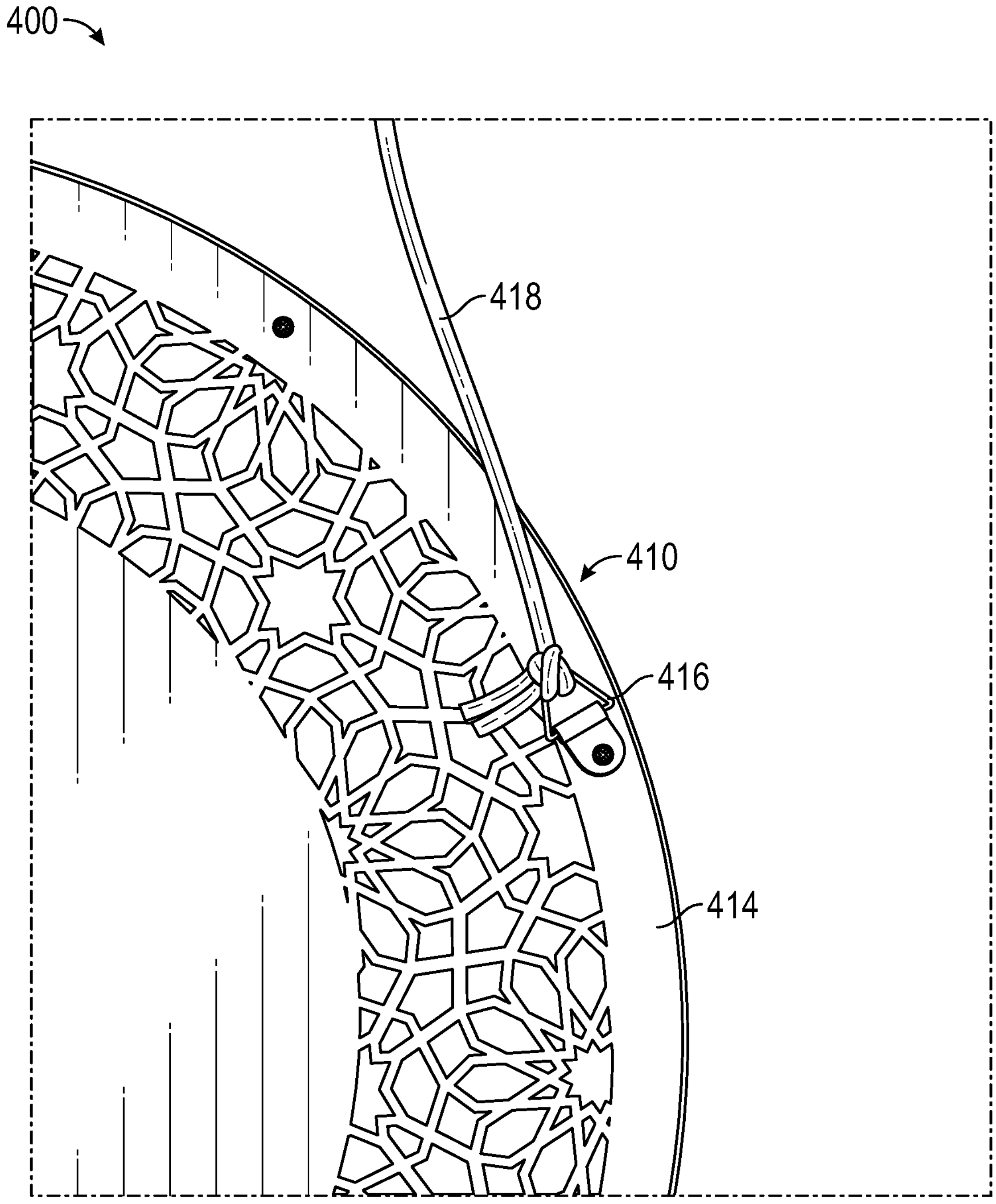
FIG. 4 depicts a view of a suspension hook and rope coupled to a surface of a base of a decorative display apparatus, according to an embodiment.

FIG. 4 depicts a view of a suspension hook 416 and rope or string 418 coupled to a rear surface 414 of a base 410 of a decorative display apparatus 400, according to an embodiment. In this embodiment, the suspension hook 416 may be attached to the rear surface 414 using a screw. Alternatively, the suspension hook 416 may be affixed to the rear surface 414 using any suitable mechanical fastener, such as nails, bolts, or clips. The decorative display apparatus 400 may include a coupling or mounting component for mounting it to a door, wall, or other structure, and it can be removably coupled to the base 410. In an embodiment, the rear surface 414 may be substantially planar or flat and smooth such that when the coupling or mounting component is removed from the base 410, the base 410 can lay flat on a surface, thereby configuring the apparatus for use as a tray, table art, or a similar functional configuration. Additionally, the coupling or mounting component may include an adjustable hinge configured to enable the decorative display apparatus 400 to pivot relative to the surface to which the apparatus is affixed. The hinge may enhance the overall flexibility of the display, allowing users to achieve optimal angles for both viewing and presentation.

The coupling component is configured to adapt and accommodate different types of supporting surfaces, such as glass, wood, carpeting, tile, concrete, asphalt, drywall, metal, and the like. This modular and interchangeable configuration allows easy modification based on the specific characteristics of the supporting surface. The coupling component may include adjustable connectors, varying attachment mechanisms, and customizable configurations to cater to diverse needs. For example, if the supporting surface is magnetic, the coupling component might include magnetic connectors. Conversely, if the surface relies on a different attachment method, the coupling component may comprise various suitable connectors such as suction cups, hooks, or adhesive elements. Furthermore, the coupling component may be constructed from flexible materials, such as gel or the like. The coupling component may be configured to mold to curved countertops or uneven ground.

The interchangeable mounting component may be affixed to the surface of the base positioned proximal to a supporting surface of a structure, designed to securely mount the apparatus to a supporting surface. The interchangeable mounting component may be altered, adjusted, or changed based on the characteristics of the supporting surface to which the apparatus is mounted. For instance, if the supporting surface has an incline, the mounting component may comprise a hanger. On the other hand, if the supporting surface is horizontally oriented, the mounting component may consist of an adhering element. Examples of suitable hangers may include hooks, loops, or clips that can securely attach to a supporting surface when it is vertically oriented. Likewise, examples of suitable adhering elements may include suction cups or adhesive pads, which are effective for adherence to a supporting surface when it is horizontally oriented.

In another embodiment, rather than utilizing the coupling component, a support structure can be coupled to the base 410. This support structure, which may include a kickstand, foldable frame, or detachable bracket, is specifically configured to facilitate the secure standing of the base on a surface. This embodiment may stabilize the decorative display apparatus 400 and provide users with options for securely placing the apparatus 400 on various surfaces.

Figure 5:
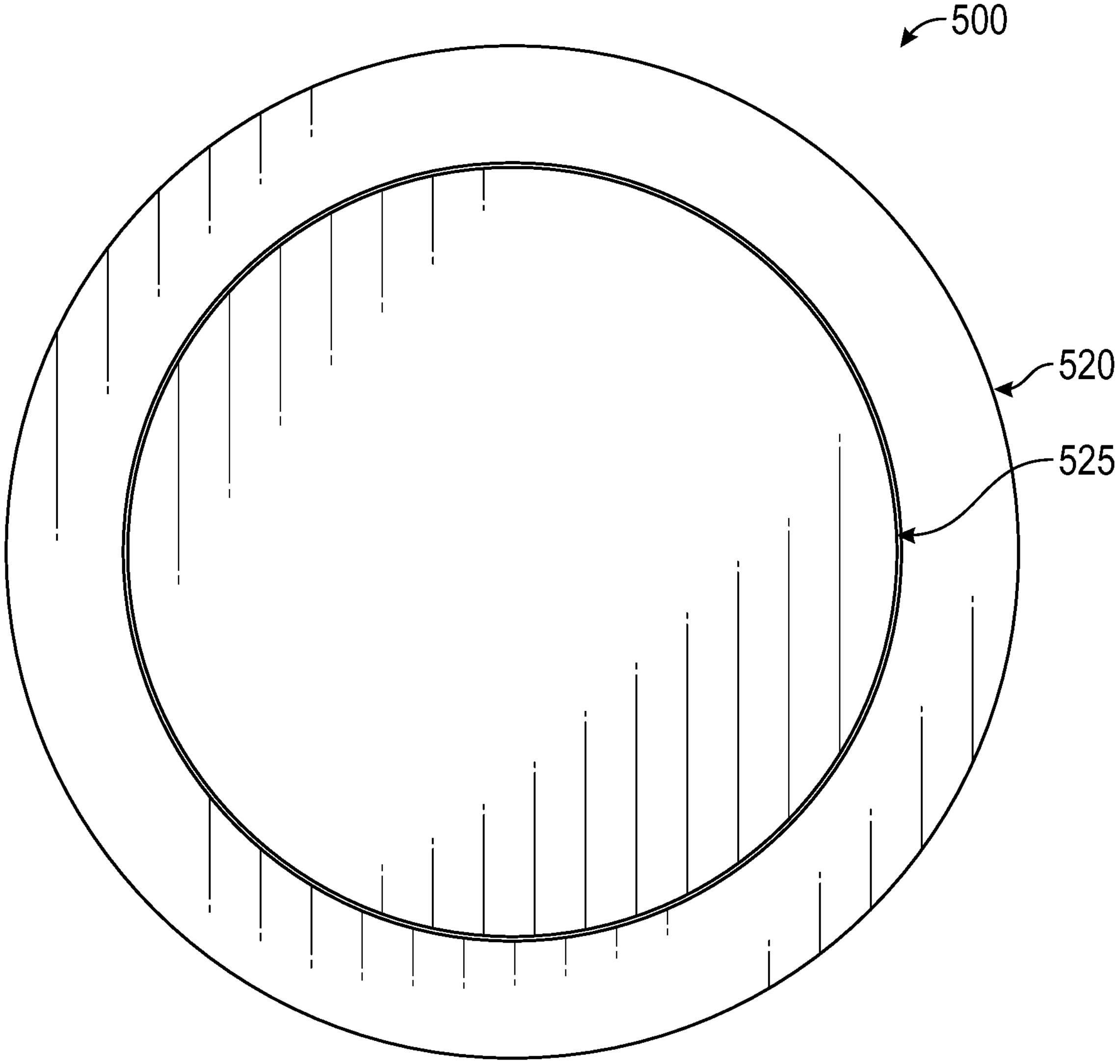
FIG. 5 depicts a view of a surface and a magnet assembly of a decorative display apparatus, according to an embodiment.

FIG. 5 depicts a view of a magnet assembly 525 on a side opposite to where a decorative element is coupled to an interchangeable component 520 of a decorative display apparatus 500. The magnet assembly 525 may be configured to magnetically couple the interchangeable component 520 to a magnetic surface of a base of the decorative display apparatus 500, preventing inadvertent dislodgment of the interchangeable component 520 while allowing for easy interchangeability. The interchangeable component 520 may be constructed from materials such as metal, medium-density fiberboard (MDF), clipboard, or wood. In an embodiment, the magnet assembly 525 may include a single magnet. The single magnet may have a sufficiently large surface area such that the interchangeable component 520 is securely coupled to the base to prevent inadvertent dislodgment due to weather conditions or other external forces but also allowing users to easily remove the interchangeable component 520. The magnetic surface of the base may include a surface area that covers most or a majority of a total area of the base, and the single magnet may include a surface area that is substantially equal to the surface area of the magnetic surface. In an embodiment, the magnetic surface of the base may include a surface area that covers 50% a total area of the base, and the single magnet may include a surface area that is substantially equal to the surface area of the magnetic surface. In another embodiment, the magnetic surface of the base may include a surface area that covers more than 50% a total area of the base, and the single magnet may include a surface area that is substantially equal to the surface area of the magnetic surface. In another embodiment, the magnet assembly 500 may include a plurality of magnets evenly spaced apart from each other to ensure the interchangeable component 520 is securely and evenly coupled to the base.

The interchangeable component 520 may include a grasping component adjacent the magnet to facilitate the disengagement of the interchangeable magnetic component 520 from the base. Examples of suitable grasping components include handles, knobs, levers, or other structures designed to be easily gripped or manipulated by a user. These components may extend downwards enough for a user to easily locate them by feeling with their hand but not so long as to touch or engage with the base, such that the grasping feature does not inadvertently disrupt or disengage the magnetic connection between the interchangeable component 520 and the base.

The type of magnet chosen for the apparatus may be tailored to the specific application. For instance, if the supporting surface has an incline, the magnet selected may involve higher magnetic strength, such as a neodymium magnet. Conversely, if the supporting surface is horizontally oriented, the magnet chosen may feature lower magnetic strength, such as a ferrite magnet.

In an embodiment, the magnet may be a Strontium ferrite magnet, a neodymium magnet, or another type of magnet, ensuring that the magnetic force between the base of the decorative display apparatus 500 and the interchangeable component 520 is strong enough to withstand various disturbances, particularly wind-induced perturbations. This prevents the interchangeable component 520 from dislodging from the base, making it particularly advantageous for outdoor applications like garden displays and various domestic settings, including tables, shelves, or countertops. The apparatus' ability to endure such perturbations enhances its stability and reliability in adverse weather conditions. The apparatus' versatility may extend to placement options, allowing secure positioning on surfaces or convenient hanging on walls using a coupling component attached to the base.

A feature illustrated in one of the figures may be the same as or similar to a feature illustrated in another of the figures. Similarly, a feature described in connection with one of the figures may be the same as or similar to a feature described in connection with another of the figures. The same or similar features may be noted by the same or similar reference characters unless expressly described otherwise. Additionally, the description of a particular figure may refer to a feature not shown in the particular figure. The feature may be illustrated in and/or further described in connection with another figure.

Elements of processes (i.e. methods) described herein may be executed in one or more ways such as by a human, by a processing device, by mechanisms operating automatically or under human control, and so forth. Additionally, although various elements of a process may be depicted in the figures in a particular order, the elements of the process may be performed in one or more different orders without departing from the substance and spirit of the disclosure herein.

The foregoing description sets forth numerous specific details such as examples of specific systems, components, methods and so forth, in order to provide a good understanding of several implementations. It will be apparent to one skilled in the art, however, that at least some implementations may be practiced without these specific details. In other instances, well-known components or methods are not described in detail or are presented in simple block diagram format in order to avoid unnecessarily obscuring the present implementations. Thus, the specific details set forth above are merely exemplary. Particular implementations may vary from these exemplary details and still be contemplated to be within the scope of the present implementations.

Related elements in the examples and/or embodiments described herein may be identical, similar, or dissimilar in different examples. For the sake of brevity and clarity, related elements may not be redundantly explained. Instead, the use of a same, similar, and/or related element names and/or reference characters may cue the reader that an element with a given name and/or associated reference character may be similar to another related element with the same, similar, and/or related element name and/or reference character in an example explained elsewhere herein. Elements specific to a given example may be described regarding that particular example. A person having ordinary skill in the art will understand that a given element need not be the same and/or similar to the specific portrayal of a related element in any given figure or example in order to share features of the related element.

It is to be understood that the foregoing description is intended to be illustrative and not restrictive. Many other implementations will be apparent to those of skill in the art upon reading and understanding the above description. The scope of the present implementations should, therefore, be determined with reference to the appended claims, along with the full scope of equivalents to which such claims are entitled.

The foregoing disclosure encompasses multiple distinct examples with independent utility. While these examples have been disclosed in a particular form, the specific examples disclosed and illustrated above are not to be considered in a limiting sense as numerous variations are possible. The subject matter disclosed herein includes novel and non-obvious combinations and sub-combinations of the various elements, features, functions and/or properties disclosed above both explicitly and inherently. Where the disclosure or subsequently filed claims recite "a" element, "a first" element, or any such equivalent term, the disclosure or claims is to be understood to incorporate one or more such elements, neither requiring nor excluding two or more of such elements.

As used herein "same" means sharing all features and "similar" means sharing a substantial number of features or sharing materially important features even if a substantial number of features are not shared. As used herein "may" should be interpreted in a permissive sense and should not be interpreted in an indefinite sense. Additionally, use of "is" regarding examples, elements, and/or features should be interpreted to be definite only regarding a specific example and should not be interpreted as definite regarding every example. Furthermore, references to "the disclosure" and/or "this disclosure" refer to the entirety of the writings of this document and the entirety of the accompanying illustrations, which extends to all the writings of each subsection of this document, including the Title, Background, Brief description of the Drawings, Detailed Description, Claims, Abstract, and any other document and/or resource incorporated herein by reference.

As used herein regarding a list, "and" forms a group inclusive of all the listed elements. For example, an example described as including A, B, C, and D is an example that includes A, includes B, includes C, and also includes D. As used herein regarding a list, "or" forms a list of elements, any of which may be included. For example, an example described as including A, B, C, or D is an example that includes any of the elements A, B, C, and D. Unless otherwise stated, an example including a list of alternatively-inclusive elements does not preclude other examples that include various combinations of some or all of the alternatively-inclusive elements. An example described using a list of alternatively-inclusive elements includes at least one element of the listed elements. However, an example described using a list of alternatively-inclusive elements does not preclude another example that includes all of the listed elements. And, an example described using a list of alternatively-inclusive elements does not preclude another example that includes a combination of some of the listed elements. As used herein regarding a list, "and/or" forms a list of elements inclusive alone or in any combination. For example, an example described as including A, B, C, and/or D is an example that may include: A alone; A and B; A, B and C; A, B, C, and D; and so forth. The bounds of an "and/or" list are defined by the complete set of combinations and permutations for the list.

Where multiples of a particular element are shown in a FIG., and where it is clear that the element is duplicated throughout the FIG., only one label may be provided for the element, despite multiple instances of the element being present in the FIG. Accordingly, other instances in the FIG. of the element having identical or similar structure and/or function may not have been redundantly labeled. A person having ordinary skill in the art will recognize based on the disclosure herein redundant and/or duplicated elements of the same FIG. Despite this, redundant labeling may be included where helpful in clarifying the structure of the depicted examples.

The Applicant(s) reserves the right to submit claims directed to combinations and sub-combinations of the disclosed examples that are believed to be novel and non-obvious. Examples embodied in other combinations and sub-combinations of features, functions, elements and/or properties may be claimed through amendment of those claims or presentation of new claims in the present application or in a related application. Such amended or new claims, whether they are directed to the same example or a different example and whether they are different, broader, narrower or equal in scope to the original claims, are to be considered within the subject matter of the examples described herein.

The invention claimed is:

1. An apparatus, comprising:

a base comprising:

a first magnetic surface; and a second surface opposite the first magnetic surface, wherein the second surface is configured to be positioned proximal to a supporting surface of a structure, wherein:

the base comprises a circular-shaped base with a laser cutout or etching surrounding the first magnetic surface; and the first magnetic surface is positioned at a center of the base; and a fitting coupled to a peripheral annular edge of the base, wherein the fitting circumscribes the peripheral annular edge;

a first interchangeable component detachably coupleable to the base, wherein:
the first interchangeable component comprises:
a first side comprising a decorative element coupled to the first side;
a second side opposite the first side; and
a magnet assembly configured to magnetically couple the second side to the first magnetic surface of the base;
the base is configured to support the first interchangeable component; and
the first interchangeable component is configured to be substituted with a second interchangeable component; and
an interchangeable mounting component attached to the second surface of the base, wherein the interchangeable mounting component is configured to:
mount the apparatus to the supporting surface or affix the apparatus onto the supporting surface;
be coupleably removeable from the second surface of the base to enable the apparatus to be positioned on the supporting surface.

2. The apparatus of claim 1, wherein:
the first magnetic surface comprises a surface area that covers a majority of a total area of the base;
the magnet assembly comprises a magnet; and
the magnet comprises a surface area substantially equal to the surface area of the first magnetic surface.

3. The apparatus of claim 1, wherein:
the magnet assembly comprises a first magnet and a second magnet; and
the first magnet and second magnet are evenly spaced apart from each other to securely couple the first interchangeable component to the base.

4. The apparatus of claim 1, wherein the first interchangeable component is constructed from materials comprising metal, medium-density fiberboard, clipboard, or wood.

5. The apparatus of claim 1, further comprising:
a first suspension hook attached to the second surface of the base;
a second suspension hook attached to the second surface of the base; and
the first and second suspension hooks are positioned on opposite ends of the second surface to receive a rope therethrough, thereby forming a loop from the rope for hanging and display of the apparatus.

6. The apparatus of claim 1, wherein:
if the supporting surface is an inclined surface, the mounting component comprises a hanger; and
if the supporting surface is horizontally oriented, the mounting component comprises an adhering element.

7. The apparatus of claim 1, wherein:
a non-magnetic spacer circumscribes the first magnetic surface; and
the non-magnetic spacer is positioned between the cutout or etching and the first magnetic surface.

8. The apparatus of claim 1, wherein the fitting is removably coupled to the peripheral annular edge to enable customization of the base appearance.

9. An apparatus, comprising:
a base comprising a magnetic material;
a first interchangeable component detachably coupleable to the base, wherein:
the first interchangeable component comprises:
a first surface comprising a decorative element coupled to the first surface, wherein the first interchangeable component is further configured to emit light onto the first surface;
a second surface opposite the first surface, wherein the second surface comprises a magnet configured to couple the second surface to the base;
the base is configured to securely hold the first interchangeable component when coupled to the base; and
the first interchangeable component is configured to be substituted with a second interchangeable component;
a support structure coupled to the base, wherein the support structure is configured to enable the base to stand on a supporting surface; and
a remote-control device configured to wirelessly control the light-emitting element on the first interchangeable component.

10. The apparatus of claim 9, wherein the support structure comprises a kickstand, foldable frame, or detachable bracket.

11. The apparatus of claim 9, wherein:
the support structure is further configured to be removably coupleable from the base; and
when the support structure is removed from the base, the base is configured to lay flat on a surface, thereby configuring the apparatus to be used as table art.

12. The apparatus of claim 9, wherein the base comprises a rechargeable battery electrically coupled to the light-emitting element.

13. The apparatus of claim 9, wherein the remote-control device is configured to control illumination intensity and color patterns.

14. An apparatus, comprising:
a base configured to securely support an interchangeable component when coupled to the base, wherein:
the base comprises a cutout surrounding a magnet;
the cutout comprises a symmetrical pattern aligned with a magnetic field of the magnet;
the interchangeable component comprises:
a first surface comprising a decorative element;
a second surface configured to be magnetically coupled to the base; and
the magnet; and
the base is configured to attach to a first supporting surface or to be positioned on a second supporting surface.

15. The apparatus of claim 14, wherein the base and magnet of the interchangeable component are complementary shaped to fit together to prevent the interchangeable component from inadvertently dislodging from the base.

16. The apparatus of claim 14, wherein the decorative element comprises a painted artwork, an engraved pattern, a printed design, or a textured surface on the first surface of the interchangeable component.

17. The apparatus of claim 14, wherein the magnet is selected according to an inclination of the first supporting surface or second supporting surface, and wherein: if the first supporting surface is an inclined surface, the magnet is a neodymium magnet; and
if the second supporting surface is horizontally oriented, the magnet is a ferrite magnet.

18. The apparatus of claim 14, wherein the second surface of the interchangeable component comprises a grasping component positioned adjacent to the magnet.

19. The apparatus of claim 14, wherein a connector comprises an adjustable hinge configured to enable the apparatus to pivot relative to the second support surface to which the apparatus is positioned on.

20. The apparatus of claim 14, wherein the symmetrical pattern comprises radial lines extending outward from a center point of the magnet.

* * * * *